(12) United States Patent
Thomas et al.

(10) Patent No.: US 10,091,391 B2
(45) Date of Patent: Oct. 2, 2018

(54) SYSTEM AND METHOD FOR CONSTRUCTING DOCUMENT IMAGE FROM SNAPSHOTS TAKEN BY IMAGE SENSOR PANEL

(71) Applicant: Bidirectional Display Inc., Acton, MA (US)

(72) Inventors: Zachary Michael Thomas, Cambridge, MA (US); Hsuan-Yeh Chang, Chestnut Hill, MA (US)

(73) Assignee: Bidirectional Display, Inc., Acton, MA (US)

( * ) Notice: Subject to any disclaimer, the term of this patent is extended or adjusted under 35 U.S.C. 154(b) by 0 days.

(21) Appl. No.: 15/348,889

(22) Filed: Nov. 10, 2016

(65) Prior Publication Data

US 2017/0134611 A1 May 11, 2017

Related U.S. Application Data

(60) Provisional application No. 62/253,586, filed on Nov. 10, 2015.

(51) Int. Cl.
| | |
|---|---|
| *H04N 1/03* | (2006.01) |
| *H04N 1/387* | (2006.01) |
| *G06K 9/00* | (2006.01) |
| *H04N 1/195* | (2006.01) |
| *G06K 9/22* | (2006.01) |
| *G06K 9/20* | (2006.01) |

(52) U.S. Cl.
CPC ....... *H04N 1/3876* (2013.01); *G06K 9/00442* (2013.01); *G06K 9/228* (2013.01); *H04N 1/19594* (2013.01); *G06K 2009/2045* (2013.01)

(58) Field of Classification Search
CPC ........ H04N 1/00307; H04N 2201/0081; G06F 3/1292; G06F 3/04842; G06F 3/1222; G06K 9/0004; G06K 9/0012; G06K 9/00442; G06K 2209/01; G06K 9/001; G06K 9/00449
USPC ...... 358/450, 1.15, 1.14, 474, 479; 382/140, 382/159; 709/206
See application file for complete search history.

(56) References Cited

U.S. PATENT DOCUMENTS

| | | | | |
|---|---|---|---|---|
| 5,115,320 | A * | 5/1992 | Ebihara | H04N 1/3873 358/296 |
| 6,373,590 | B1 * | 4/2002 | Ancin | H04N 1/3876 358/1.18 |
| 6,961,478 | B2 * | 11/2005 | Inoue | G06T 5/20 358/450 |

(Continued)

*Primary Examiner* — Negussie Worku
(74) *Attorney, Agent, or Firm* — Hsuanyeh Law Group, PC

(57) ABSTRACT

In one aspect, the present disclosure provides a system and a method for constructing a document image from snapshots of portions of a subject document taken by a two-dimensional image sensor panel. In another aspect, the present disclosure provides a mobile electronic device comprising: an image sensor panel; a non-transitory computer readable memory; and a processor configured to: capture a sequence of frames from the image sensor panel, identify corresponding features in said sequence of frames, combine said sequence of frames into a resultant image such that the corresponding features are spatially collocated in the resultant image, and record the resultant image to the memory.

20 Claims, 6 Drawing Sheets

(56) References Cited

U.S. PATENT DOCUMENTS

| | | | | |
|---|---|---|---|---|
| 8,068,693 B2* | 11/2011 | Sorek | ............... | G06T 3/4038 |
| | | | | 358/450 |
| 8,477,394 B2* | 7/2013 | Jonsson | ............ | H04N 1/486 |
| | | | | 358/300 |
| 8,699,822 B2* | 4/2014 | Park | ...................... | G06T 5/50 |
| | | | | 348/221.1 |
| 8,705,145 B2* | 4/2014 | Shan | ............. | H04N 1/00244 |
| | | | | 358/450 |
| 2003/0107059 A1* | 6/2003 | Chen | ............... | G03F 7/2051 |
| | | | | 257/257 |
| 2009/0086886 A1* | 4/2009 | Akahori | ............ | A61B 6/025 |
| | | | | 378/11 |
| 2010/0195156 A1* | 8/2010 | Horiuchi | ......... | H04N 1/00355 |
| | | | | 358/1.16 |
| 2010/0283589 A1* | 11/2010 | Kawai | ................ | B60Q 9/005 |
| | | | | 340/425.5 |
| 2014/0055638 A1* | 2/2014 | Son | ................... | H04N 5/2353 |
| | | | | 348/229.1 |
| 2015/0084986 A1* | 3/2015 | Lee | ..................... | G06T 11/00 |
| | | | | 345/629 |
| 2016/0210529 A1* | 7/2016 | Nishiyuki | ........ | G06K 9/627 |
| 2016/0266695 A1* | 9/2016 | Bae | ................. | G06F 1/1643 |
| 2017/0090668 A1* | 3/2017 | Agarwal | ........... | G06F 3/0418 |
| 2017/0139565 A1* | 5/2017 | Choi | .................. | G06F 3/0483 |
| 2017/0316248 A1* | 11/2017 | He | ................. | G06K 9/00006 |
| 2017/0364763 A1* | 12/2017 | Jin | ................... | G06K 9/0002 |

* cited by examiner

SYSTEM AND METHOD FOR CONSTRUCTING DOCUMENT IMAGE FROM SNAPSHOTS TAKEN BY IMAGE SENSOR PANEL

RELATED APPLICATIONS

The present application claims the benefit of priority to U.S. Provisional Application No. 62/253,586, filed on Nov. 10, 2015, the entire contents of which are incorporated herein by reference for all purposes.

This application relates to U.S. Pat. No. 9,122,349 to Chang et al., issued on Sep. 1, 2015, and U.S. Nonprovisional application Ser. No. 15/282,153, filed on Sep. 30, 2016, which claims the benefit of priority to U.S. Provisional Application No. 62/236,125, filed on Oct. 1, 2015, the entire contents of all of which are incorporated herein by reference for all purposes.

TECHNICAL FIELD

The present disclosure relates to a system and a method for constructing a document image from snapshots of portions of a subject document taken by a two-dimensional image sensor panel. More particularly, the present disclosure relates to a system and a method for reconstructing a document image from snapshots taken while swiping a two-dimensional image sensor panel over a subject document.

BACKGROUND

Imaging of documents with one-dimensional array sensors, as currently used for flatbed scanners and manual scanners, requires accurate spatial encoding to determine the position of imaged material in the scan direction. More specifically, a spatial encoder must record the position of the scanner and associate it with the corresponding scanner data in order to properly reconstruct the page. If the scan is not properly encoded, it may result in an undesirably distorted image.

A device having a two-dimensional (2D) array of photosensitive pixels, a.k.a., an image sensor panel (ISP), is disclosed in U.S. Pat. No. 9,122,349. The ISP allows for imaging by placing an information bearing substrate (e.g., a document) on the surface of the panel for capture. With the advent of the ISP, imaging of documents is possible, but difficulties arise when the dimensions of the ISP are smaller than the dimensions of the document to be imaged. While ISPs can take various sizes, a practical configuration is that the ISP is integrated into the screen of a smartphone, a tablet, or other portable devices and thus has an effective photosensitive area comparable to the screen size. Smartphones may have screens ranging in size roughly from 4 to 8 inches (diagonal) which is considerably smaller than many standard documents (e.g., A4 or US Letter size) for which a user may wish to obtain a high quality, on-the-go image. For example, for an "oversize" document (i.e., the document size being greater than the ISP size), a particular ISP cannot image the entire document in a single capture or snapshot.

Accordingly, there is a need to develop new systems and methods for capturing high-quality, on-the-go imaging of "oversize" documents, such as pages, reports, printed photographs, and the like.

SUMMARY

The present disclosure provides a 2D imaging device that eliminates the need for a separate spatial encoder to construct a larger image from a series of smaller images or "frames." The imaging device has a 2D array of photosensitive pixels called an image sensor panel (ISP) having an array of photosensitive pixels. The photosensitive pixels are formed on a transparent substrate and physically separated from each other to intentionally leave transparent areas between the pixels for the light source. The photosensitive pixels can be configured to measure optical input signals substantially simultaneously (or within a human-perceptible time period). The measured frame is stored in memory of the imaging device for concurrent or later processing. The frame capture process can be repeated to capture and store a series of frames in rapid succession. The frames are combined or stitched together to produce a digital reproduction of the document.

In one aspect, the present disclosure provides a mobile electronic device comprising: an image sensor panel; a non-transitory computer readable memory; and a processor configured to: capture a sequence of frames from the image sensor panel, identify corresponding features in said sequence of frames, combine said sequence of frames into a resultant image such that the corresponding features are spatially collocated in the resultant image, and record the resultant image to the memory.

In one embodiment, the corresponding features are identified in temporally adjacent frames in said sequence of frames.

In one embodiment, the mobile electronic device further comprises an encoder for recording position and orientation of the mobile electronic device, and wherein the corresponding features are identified in frames in said sequence of frames that are determined from information recorded by the encoder to be spatially overlapping.

In one embodiment, the mobile electronic device further comprises a user input device, wherein the processor is further configured to capture frames for said sequence of frames until receiving a signal from the user input device commanding termination of capture of additional frames.

In one embodiment, after capture of a subset of the sequence of frames, the processor: performs the identifying and combining on said subset; detects an incomplete document from the resultant image; and continues capture of the sequence of frames based on the detection of the incomplete document.

In one embodiment, the processor detects the incomplete document by determining an edge of the document does not form a complete perimeter of said document.

In one embodiment, the processor detects the incomplete document by detecting an edge of the document forming a complete perimeter and determining an area interior to the complete perimeter has not been completely imaged by the sequence of frames.

In one embodiment, the processor is further configured to: detect a complete document in the resultant image; and terminate capture of frames in the sequence of frames.

In one embodiment, the processor is configured to detect the complete document by detecting an edge of the document forming a complete perimeter and determining an area interior to the complete perimeter has been completely imaged by the sequence of frames.

In one embodiment, the mobile electronic device further comprises an encoder for recording position and orientation of the mobile electronic device, wherein the processor is further configured to: record position and orientation of the device at a time of capturing each frame in the memory, and digitally shift and rotate each frame at least in part based on the position and orientation information measured by the encoder.

In another aspect, the present disclosure provides a method of imaging a document using a handheld device having an image sensor panel (ISP), the method comprising: capturing a first frame corresponding to a first portion of the document using the ISP; capturing a second frame corresponding to a second portion of the document using the ISP, the second portion of the document overlapping with the first portion of the document at a common portion; spatially aligning the first frame and the second frame such that the common portion of the document imaged by both the first frame and second frame spatially coincide; and combining the spatially aligned first frame and second frame into a single image.

In one embodiment, capturing the first frame comprises illuminating the first portion of the document with a probing light of a first color, capturing the second frame comprises illuminating the second portion of the document with the probing light of the first color, the capturing of the first and second frames is repeated with a probing light of a second color, and the spatially aligning and combing is performed independently for the frames captured with the probing light of the first color and the probing light of the second color to produce a first color single image and a second color single image, the method further comprising: combining the first color single image and the second color single image to produce a multi-colored single image.

In one embodiment, the method further comprises sequentially capturing additional frames using the ISP until a stop capture command is generated; and repeating the spatially aligning act and the combining act for the additional frames wherein each iteration the first frame is replaced with the single image from the previous iteration and the second frame is replaced with a next additional frame among the additional frames.

In one embodiment, the method further comprises: analyzing the single image to detect an edge of the document forming a perimeter within the single image; determining the single image is fully captured within the perimeter; and in response to successfully completing the analyzing and determining, generating the stop capture command.

In one embodiment, the method further comprises receiving a user input and generating the stop capture command.

In yet another aspect, the present disclosure provides a method for constructing a document image, comprising: placing an image sensor panel device proximate or in contact with a subject document with an image capturing surface of the image sensor panel facing the subject document, wherein the image sensor panel device comprises a surface light source and an array of photosensitive pixels disposed on the surface light source, the photosensitive pixels being spaced apart from each other to allow the surface light source to pass therebetween; traversing the image sensor panel device on the subject document along a path, and while the image sensor panel device traverses on the subject document, capturing a plurality of snapshots each corresponding to a part of the subject document at various locations of the path, a least a portion of neighboring snapshots overlapping with each other; and constructing a document image of the subject document by stitching the captured snapshots in accordance with the overlapped portion of the neighboring snapshots.

In one embodiment, the method further comprises: in response to detecting an edge of the document forming a complete perimeter and determining an area interior to the complete perimeter has been completely imaged by the plurality of snapshots, stopping capture of additional snapshots by the image sensor panel.

In one embodiment, constructing the document image by stitching comprises spatial shifting and spatially rotating snapshots to align features imaged in the plurality of snapshots.

In one embodiment, the stitching further comprises resampling the spatially shifted and spatially rotated plurality of snapshots to conform to a defined grid of image pixel locations for the document image.

In one embodiment, the defined grid is a rectangular grid.

DETAILED DESCRIPTION

Disclosed herein are systems and methods which utilize an ISP to capture high quality images of information bearing substrates (hereinafter referred to simply as "document" or "documents") that are "oversize" (i.e., the documents having a surface area greater than that of the ISP). It should be appreciated that while a document may be "oversize" with respect to one ISP, it may not be oversized with respect to another ISP. It is also noted that, while the term "image sensor panel" (or "ISP") may have been coined in U.S. Pat. No. 9,122,349, the term is used to refer to any two-dimensional imaging surface requiring contact or proximal placement of a document for imaging.

Figure 1:
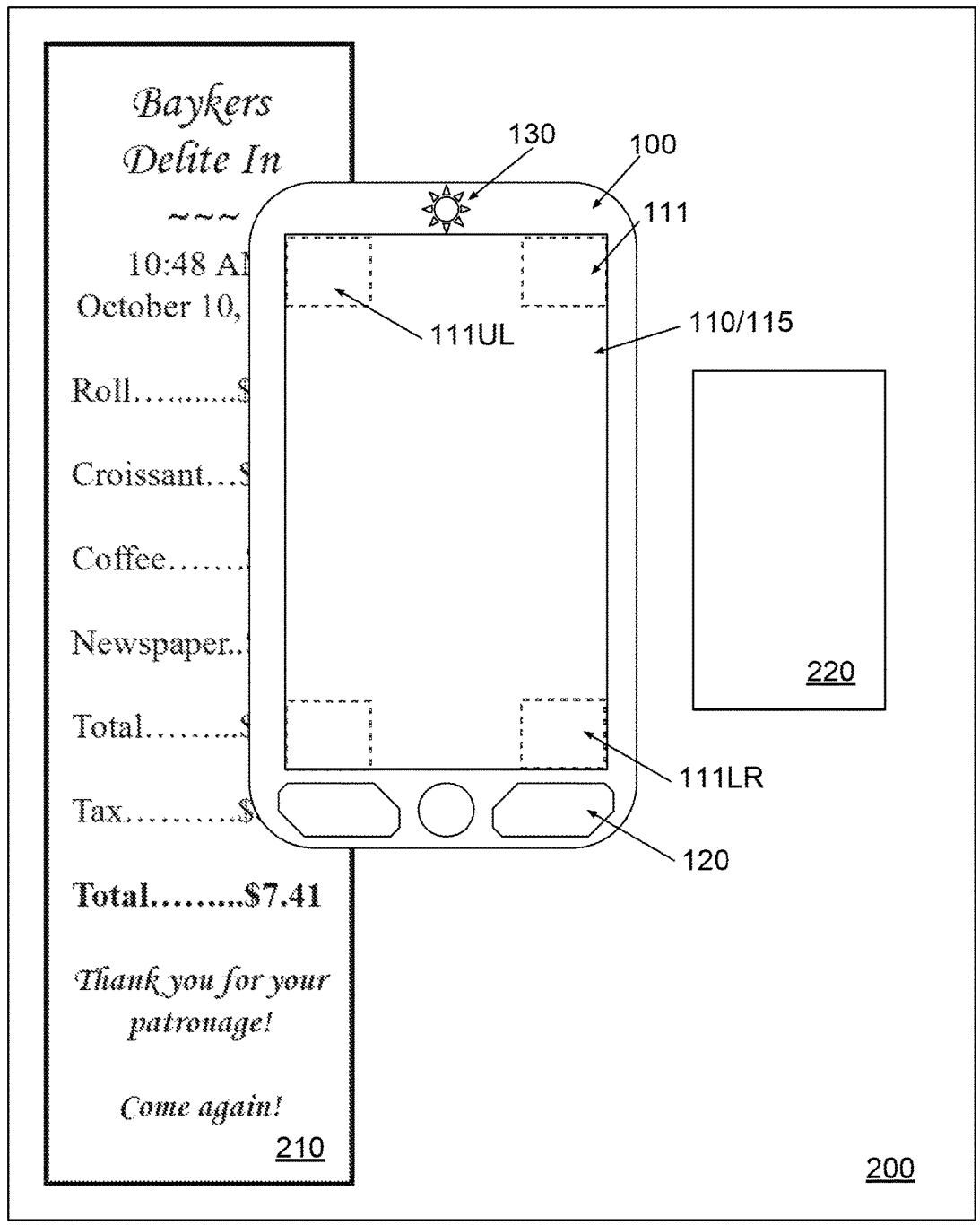
FIG. 1 illustrates a schematic diagram of a 2D imaging device configured to capture an image of different documents in accordance with an embodiment of the present disclosure.
Figure 2:
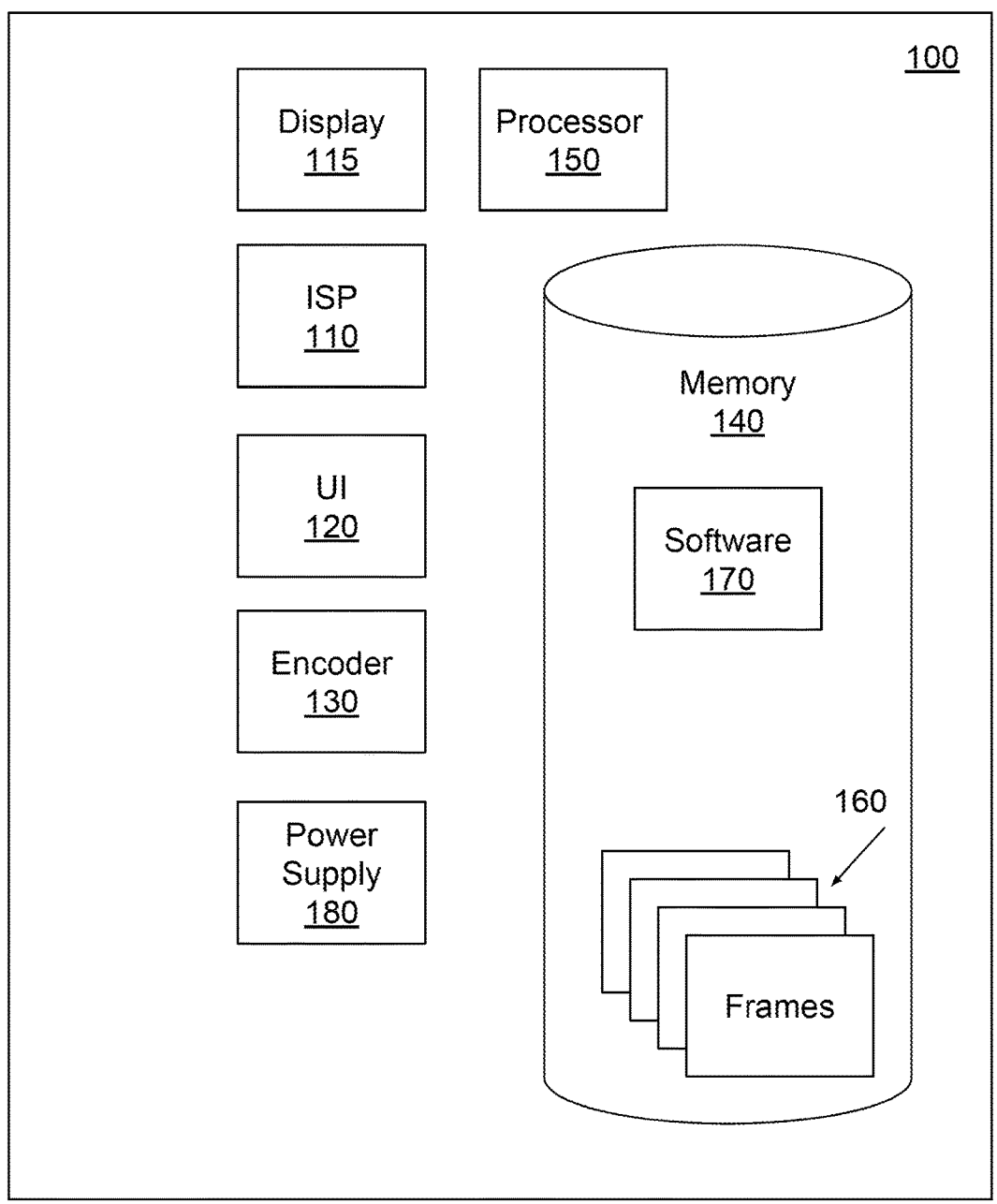
FIG. 2 illustrates a block diagram of a 2D imaging device in accordance with an embodiment of the present disclosure.

FIGS. 1 and 2 respectively show a schematic diagram and a block diagram of a 2D imaging device 100 according to some embodiments. Device 100 may have an ISP 110, a display 115, a user interface (UI) 120, an encoder 130, memory 140, a processor 150, and power supply 180. In various embodiments, device 100 may be a smartphone, a tablet, a portable handheld electronic device, or any other suitable mobile devices. In some embodiments, ISP 110 is collocated with display 115 (e.g., AMOLED, LCD, LED, plasma). ISP 110 and display 115 may be stacked on one another or may share components. For example, a backlight may be shared by both the display, or an AMOLED may be used as backlight to illuminate a document during capture by ISP 110. It is appreciated that device 100 may be a stand-alone 2D scanner including a planar light source (e.g., a light guide plate or a planar OLED light source) and an ISP disposed directly on the planar light source. In certain embodiments, a thin film optical diffuser may be optionally disposed between the planar light source and the ISP to produce a surface light source of better homogeneity Also shown in FIG. 1 are documents 200, 210, and 220, which may be a letter 200, a receipt 210, and a business card 220, respectively. Documents 200 and 210 are "oversize" in connection with the embodiment of ISP 110 shown in FIG. 1, while document 220 is not oversize because it can fit on ISP 110.

UI 120 may be used to activate/terminate capture by ISP 110. UI 120 may include keys/buttons, as alluded to in FIG. 1, or any other suitable type of input/output devices. For example, UI 120 may include hard keys, soft keys, a capacitive touch interface, microphone, speaker, and the like. In certain cases, ISP 110 and display 115 may be considered as part of UI 120 and vice versa. If device 100 includes another display, it may be used to review the captured images before and/or after construction.

In some embodiments, device 100 includes an encoder 130 for recording the position of device 100. As shown in FIG. 1, encoder 130 may be physically exposed to the "outside" of device 100 for encoding the position of device 100, as may be necessary for an optical or a mechanical encoder (e.g., device similar to an optical or mechanical pointer used in a computer mouse). In some other embodiments, encoder 130 need not access the outside directly and may be embedded within the device. An example of such is the use of an accelerometer as part of encoder 130.

In one embodiment, portions of the ISP 110 can be configured to perform same or similar functions of encoder 130. For example, one or more corners 111 of ISP 110 can be driven to serve as encoder 130, while each corner 111 take a square or rectangular region and includes an array of, for example, 100×100 photosensitive pixels. Specifically, while a user swipes device 100 in an effort to scan an image of an "oversize" document, two, three, or four corners 111 can be driven independently or conjunctively to measure the relative position and moving direction of device 100 by comparing two snapshot images sequentially captured by each corner 111.

Because each corner can independently measure the relative moving position and direction of that corner, the four corners 111 of ISP 110 can be configured conjunctively to measure the rotational movements of device 100 on a document. For example, in response to a user's rotational force exerted on device 100, the upper left corner 111UL can measure a movement to the right direction with a first distance, while the bottom right corner 111BR can measures a movement to the left direction with a second distance. In this example, by using the first and second distance and the left and right moving directions, it can be determined that device 100 is actually rotated clockwise with a rotation angle of certain degrees.

In certain cases, ISP 110 can be included in a pointing device (e.g., a computer mouse) in place of a conventional CMOS sensor to add a new degree of freedom for the pointing device. For example, when a pointing device includes an ISP 110, two, three, or four corners 111 of ISP 110 can be configured to function together and measure the rotation angle of the pointing device on a surface. In one embodiment, a pointing device of the present disclosure can be used in a graphics software to grab a cropped image piece, drag the cropped image piece from a first location to a second location, and rotate the cropped image piece to a new orientation. The grabbing, dragging, and rotating can be performed with a single click of the pointing device.

It is appreciated that a CMOS sensor in a conventional pointing device can also be divided into two, three, four, or more sub-regions, and driven collectively in a manner similar to corners 111 of ISP 110, as discussed above.

Processor 150 and memory 140 may be operably connected to one another and to the other hardware and software components of device 100 to implement a computer system. Memory 140 may be configured to store computer readable instructions in a non-transient form. For example, the methods described herein may be implemented in part or in whole by algorithms implemented as software 170 stored in memory 140. The computer readable instructions may be executed by hardware processor 150.

Frames 160 captured by ISP 110 may be stored in memory 140. Frames are the digital images captured by ISP 110. The dimensions of frames 160 may be the same as the dimensions of ISP 110 or a subset of the photosensitive pixels of ISP 110 may be used for capture, resulting in a smaller image. For example, ISP 110 may have dimensions 3 inches by 5 inches, but perhaps an imaging area of only 2.5 inches by 4.5 inches is used for capturing images. In this case, of course, it is the smaller (i.e., actual) dimensions that are used to determine if a document is oversized.

Frames 160 may also be captured in such a way that they are a lower resolution than the native resolution of ISP 110. For example, ISP 110 may be a 400 ppi (photosensitive pixels per inch), but frame 160 may be captured at 100 ppi by either measuring only one out of every four photosensitive pixels, combining the measurements of groups of four photosensitive pixels, or in any other suitable way of down sampling.

Processor 150 may also be operably connected to ISP 110, display 115, UI 120, and encoder 130 to send and/or receive commands from these and other peripheral devices not shown (e.g., wired computer network interface, wireless computer network interface, and the like).

Though the block diagram of device 100 shows such components as separate and distinct, it should be appreciated that the components may be implemented in combination with one another, whether in hardware or in software, as applicable, and may housed in a single housing as shown in FIG. 1 or in multiple housings in any suitable way.

Figures 3A, 3B:
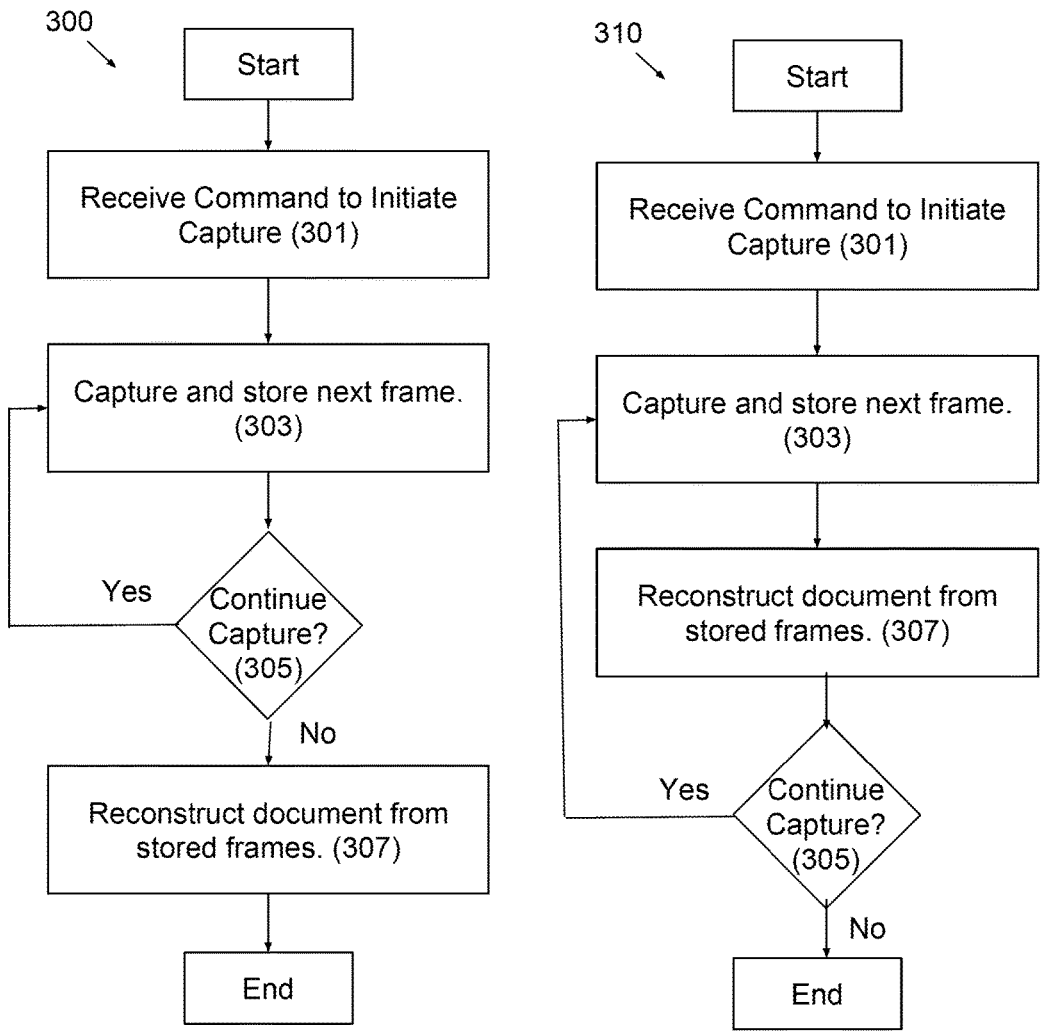
FIGS. 3A through 3C illustrate methods for constructing a document image from snapshots of portions of the document in accordance with embodiments of the present disclosure.

First Embodiment—FIG. 3A

Turning now to FIG. 3A, a method 300 is shown for capturing an image of an oversize document. Method 300 may be implemented by device 100, however, any suitable device may be used.

At step 301, device 100 receives a command to initiate capture of an oversize document. Such a command may be received through software; through UI 120 (e.g., as a button press or voice command); or in any suitable way. In some embodiments, images captured by ISP 110 trigger the command received at step 301. For example, images captured by ISP 110 may be analyzed to determine that ISP 110 has been placed on a document. For example, substantial contrast in images captured by ISP 110 when not on a document may be very low as compared to when ISP 110 is placed on a document. Such a distinction in contrast may be used to trigger the command to initiate capture.

Step 301 triggers step 303, at which ISP 110 captures a first frame. Device 100 stores the frame in memory 140. At the capture of the first frame, it is indicative that the user has placed the surface of the ISP 110 in contact with the oversize document. The position of ISP 110 relative to the oversize document is not critical to method 300. Nonetheless, it is appreciated that with fewer frames required to cover the document, generally less processing time will be required to reconstruct the document (at step 307).

In some embodiments, additional metadata is stored with the frame as part of step 303. This metadata may include information recorded from encoder 130 such as the position and orientation of the ISP 110. The position and orientation may be in an absolute coordinate system or a relative coordinate system. For example, the position and orientation of the ISP at the time of capture of the frame may be relative to the position and orientation of the ISP at the time of the immediately preceding frame, at the time of the first frame, relative to some other suitable reference point.

At step 305, after frame capture and storage, method 300 determines whether additional frames are to be captured. The absence or presence of a particular user input through UI 120 may be used to determine whether additional frames are to be captured. Alternatively or additionally, a timer or another suitable algorithm may be used to determine whether to continue or stop capturing additional frames. The determination may be made in any suitable way. If it is determined at step 305 to continue capturing additional frames, method 300 returns to step 303 and captures an additional frame from ISP 110 and stores it in memory 140.

Method 300 thus loops until it is determined at step 305 that additional frames are not to be captured. During this looping period a user may "swipe" device 100 over the surface of the oversized document as shown for example in FIGS. 4A and 4B.

Figure 4A:
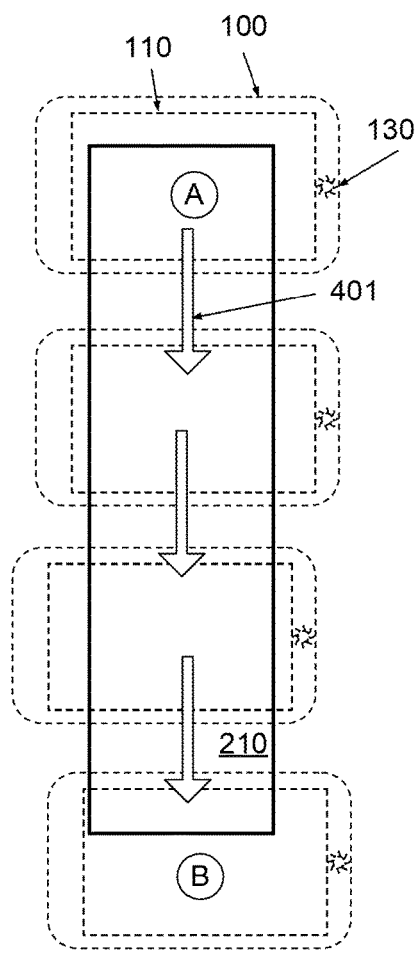
FIGS. 4A and 4B illustrate methods for capturing snapshots of portions of a subject document in accordance with embodiments of the present disclosure.

FIG. 4A shows an example swipe of document 210 using device 100 during which method 300 may be executed. In this example the swipe starts at position "A" at which the triggering step 301 occurs. In one embodiment, step 301 may be triggered as soon as device 100 determines that at least a first right-angled corner of document 210 is present in the first frame (due to high optical contrast). The swipe continues to traverse down document 210 in the direction of arrows 401 until ISP 110 has "covered" the entirety of document 210 and at position "B" and a "No" determination is made at step 305. In one embodiment, device 100 can make the "No" determination when at least a second right-angled corner (having a different or opposite orientation than that of the first right-angled corner) of document 210 is present in the last frame. Dashed representations of device 100 and arrows 401 are intended to illustrate the general motion of the swipe action controlled by the user in this example.

Figure 4B:
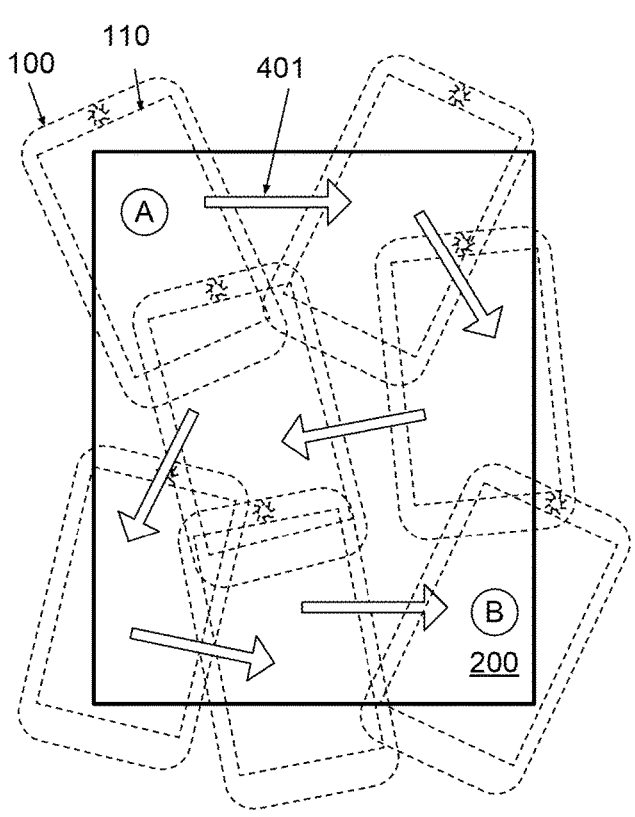

FIG. 4B shows an example swipe of document 200. Here the swipe motion is more complicated, because document 200 is larger than ISP 110 in two dimensions. Again the swipe begins at position "A" and the triggering of step 301. In one embodiment, the triggering of step 301 is achieved by determining that the first captured frame includes an upper left corner of document 200. The swipe continues in the direction of arrows 401 until ISP 110 has covered the entire document 200. At position "B" a "No" decision is made at step 305. In one embodiment, the "No" decision is made when the most recently captured frame (last frame) includes a lower right corner of document 200. Dashed representations of device 100 and arrows 401 are intended to illustrate the general motion of the swipe action controlled by the user in this example.

Throughout the swipe method 300, multiple frames 160 are captured and stored in memory 140. Frame captures according to step 303 may occur on a continuous basis (i.e., sequentially capturing multiple frames at a frame rate of, e.g., greater than 10 frames per second), not only at the dashed representations of device 100 as shown in FIGS. 4A and 4B. The finite frequency of the capture, that is how quickly steps 303 and 305 loop may be limited by hardware or software, but should be sufficiently frequent such that during a swipe action areas covered by ISP 110 are not missed because of device 100's failure to capture a frame. The maximum frame rate of course will be determined by the specific hardware and software of device 100 and a user must adjust the speed of the swipe action to ensure that the captured frames sufficiently cover the oversized document.

Once it is determined at step 305 that capture of additional frames is not to continue, method 300 continues to step 307. At step 307, frames 160 are reconstructed into a digital representation of the document.

Numerous methodologies exist for stitching images together. Image stitching is the process of combining multiple photographic images with overlapping fields of view to produce a larger image, such as, a segmented panorama or high-resolution image. Image stitching algorithms are typically implemented in software. Although the details differ with implementation, a relatively generic image stitching algorithm includes the following steps. First, a mathematical model relates the coordinates in one image to the coordinates in an overlapping image. Typically, the pixel coordinate system is used for digital images.

To achieve the correct alignment of the images, an algorithm may combine direct pixel-to-pixel comparisons with gradient descent and other optimization techniques. Distinctive features can be found in each image and then efficiently matched to rapidly establish correspondences between pairs of images. When multiple images exist in a panorama, for example, techniques have been developed to compute a globally consistent set of alignments and to efficiently discover which images overlap with one another. A final compositing surface is defined onto which all of the aligned images are warped or projectively transformed. Special algorithms exist to address issues such as parallax, lens distortion, scene motion, and exposure differences.

Because imaging with an ISP is "lensless" and has a consistent lighting source, many of the common challenges of image stitching such as parallax, lens distortion, and exposure differences are eliminated. If the document being imaged is a static document, the challenge of scene motion is also eliminated.

It should be appreciated in connection with method 300 that ISP 110 may capture the frames at step 303 in any suitable way. For example, in some embodiments, ISP 110 comprises individually color filtered photo-pixels to permit full color imaging with a single readout of the ISP. In another embodiment, different color components (e.g., red, green, blue) are captured sequentially using probing light of the corresponding color and the results combined to form the frame. In yet another embodiment, the different color components are each independently managed until a final reconstruction in step 307. For example, red frames, green frames, and blue frames are each captured at step 303, but rather than combining these "sub-frames" into a single color frame as part of step 303, they are managed independently. At step 307, the set for red frames is reconstructed to form the red portion of the digital representation, and the sets of green and blue frames are reconstructed to form the green and blue portions of the digital representation, respectively. Finally, the red, green, and blue portions of the digital representation may be combined to form a final, color digital representation. Alignment techniques such as those described in connection with step 307 may be used to ensure the red, green, and blue portions are properly aligned in the final digital representation. Advantageously, this approach accommodates movement of the ISP between capture of sub-frames without introducing blurring.

Figures 5A, 5B, 5C:
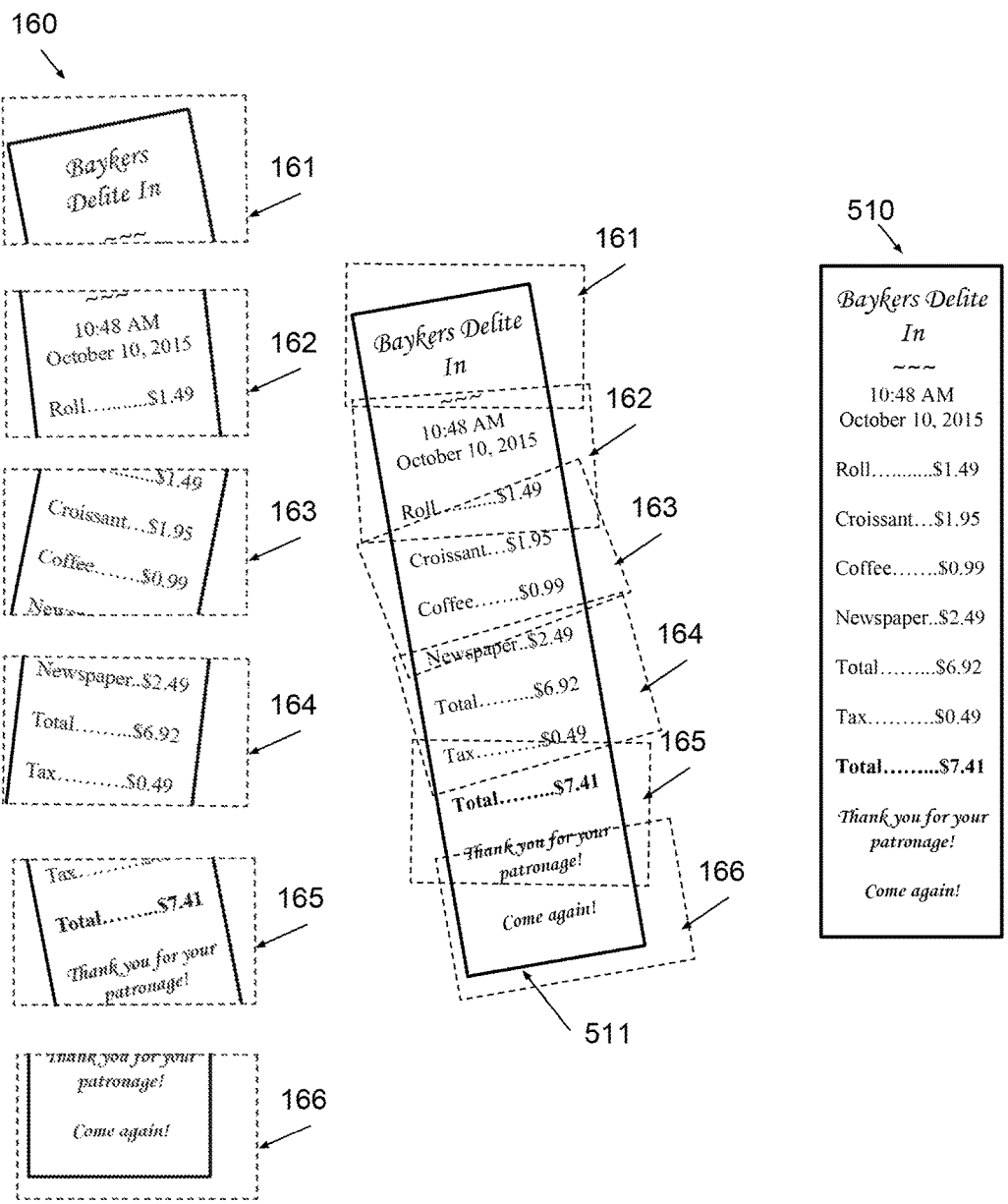
FIGS. 5A through 5C further illustrate the image construction or reconstruction process in accordance with embodiments of the present disclosure.

FIGS. 5A through 5C further illustrate the image reconstruction process. Initially the results of steps 301-305 are frames 160 shown in FIG. 5A for an example swipe of document 210. In this example, frames 160 includes 6 frames (frames 161-166), though as discussed above, any number of frames may be captured. At step 307 these frames are recombined to form a digital representation of document 120. In order to do this reconstruction, method 300 may consider frames 160 in order of capture. For example, first frames 161 and 162 are combined. In some embodiments frame 161 is treated as a reference frame and frame 162 is searched for elements matching those of frame 161. In this example, frames 161 and 162 both include three tildes. These features may be recognized and frame 162 may be digitally rotated and aligned with frame 161. In some embodiments, this may be done using a correlation filter, which will peak when the agreement between the overlapping portions of the frames is maximized. This may be implemented as a three-dimensional search where the dimensions are the x position, y position, and rotation of image 162 relative to image 161. Advantageously, the scale of the document portions imaged in frames 160 is consistent across frames when imaged by a lensless ISP. According rescaling is not necessary, reducing the computational burden.

In some embodiments information about the relative position and/or orientation of the ISP may be determined from recorded metadata. As described above, such metadata may be obtained from encoder 130. Knowing the position and orientation of the ISP relative to the previous frame may substantially reduce the computational burden of image reconstruction. If the position and orientation were recorded perfectly a simple translation would be sufficient to reconstruct the frames. In practice this translation may be used as a first guess with the best choice then determined by a search of the surrounding area (i.e., slight changes in position/orientation) with the correlation filter.

The combined result of frames 161 and 162 are now treated as the reference frame and frame 163 is added. The alignment search may be performed in a similar way as used to combine frames 161 and 162. Once the best alignment is achieved the combined results of frames 161-163 are treated as the reference frame and 164 is to be added. This continues until all frames have been considered. The result is shown in FIG. 5B with the individual frames outlined to further illustrate the reconstruction.

In some embodiments an edge detection algorithm is used to identify the edge 511 of document 120. Edge detection algorithms may for example, may use a color or intensity gradient as a basis for detecting the edge of a document. Edge detection may assume a certain shape of a document, for example, a rectangular shape may be assumed. An edge detection algorithm may be implemented in any suitable way.

The edge may be used to determine a particular orientation of the document and to crop undesired portions of the frame that do not correspond to the document. For example, as many image formats assume a rectangular image, the edges of a digital representation of a rectangular document may be rotated to align with the edges of the pixelated image space. Using edge 511, the digital representation of document 120 (digital image 510) is aligned with the pixelated image space. For non-rectangular documents, the rotation may be such as to minimize the area of the pixelated image space.

In order to reduce the loss of image fidelity due to rotation, the final reconstruction as digital image 510 may be performed after the orientation of the final image is determined. That is, during the reconstruction process, the relative positions and orientations of each of the frames may be recorded, but the final image blending process may be performed once the final orientation of the image is determined. Such a blending process is necessary since the pixel locations of the rotated image may no longer correspond to pixel locations in the image file format in which the image is to be saved or the pixel locations of the screen on which the image is to be displayed. Such blending process resamples the images to conform the pixel location grid of the image file format or display. For example, these constraints may require the final image to be defined as a rectangular grid of image pixel locations, though other grids, such as square, hexagonal, or any other suitable definition may be used. It should be appreciated that because of the redundant data provided by multiple captures of the same portions of the document, super-resolution techniques may be used to enhance the overall resolution of the document. As a result, the frames may be reconstructed to produce a focused, evenly lit, undistorted, high-resolution digital reproduction of the document.

At the end of method 300, a user may review the constructed document image and determine that certain area of the document has not been recorded ("gaps"). Method 300 may be restarted to capture additional frames to "fill in" the gaps. That is, the previously recorded frames and the additional frames may be pooled at step 307 to reconstruct the document image. In another embodiment, at step 307, the previously constructed document may be treated as a reference frame and the additional frames may be combined with the reference frame in ways discussed in connection with step 307. It is appreciated that a more exhaustive search may be required under these circumstances, because the relative location of the additional frames have not been captured as part of a swipe motion, but rather specifically placed to fill in the previously uncaptured gaps. Though, if an encoder is used (as discussed in connection with method 320), the location of the additional frames in the document may be determined from such data.

In some embodiments, gaps are detected automatically at step 307 as locations within the document (e.g., as defined by the edge) where no image data exists. These locations may be represented with a high contrast color to readily identify these locations to the user. In another embodiment, a blend or background color is chosen in attempt to disguise the missing locations. If gaps are detected the user may be prompted to capture additional frames at the gap locations.

Similarly, the user may determine that blurred or aberrant frames are captured and used to reconstruct the document. In some embodiments, the user may review the set of captured frames and remove/replace aberrant frames. Step 307 may thus be performed after removal/replacement of aberrant frames in the frame set. In another embodiment, aberrant frames are automatically detected at step 307 and discarded prior to reconstruction. If removal of the aberrant frame results in a gap, the user may be prompted to capture additional frames.

Second Embodiment—FIG. 3B

Turning now to FIG. 3B, a method 310 is presented in which the image reconstruction step is performed effectively concurrently with image capture during a swipe. That is, step 307 (reconstruction) adds each frame to the reference frame during the capture process rather than after it. An advantageous feature of this embodiment is that the composite reference frame may be used as a triggering mechanism at step 305 to determine that no more image capture should occur. For example, once the entire edge of the document has been detected (i.e., the entire perimeter of the document has been identified) and the entire interior surface area of the document covered (i.e., everything within the documents perimeter), capture may be stopped directly by the algorithm. In fact, edge detection may be used to determine whether a document is oversized or not oversized. In the later case, provided, the document has been placed entirely on the ISP, only a single capture event with ISP 110 may be required to image the document. Except as described here, steps 301-307 may be performed in ways described in connection with method 300 or in any other suitable way.

Figure 3C:
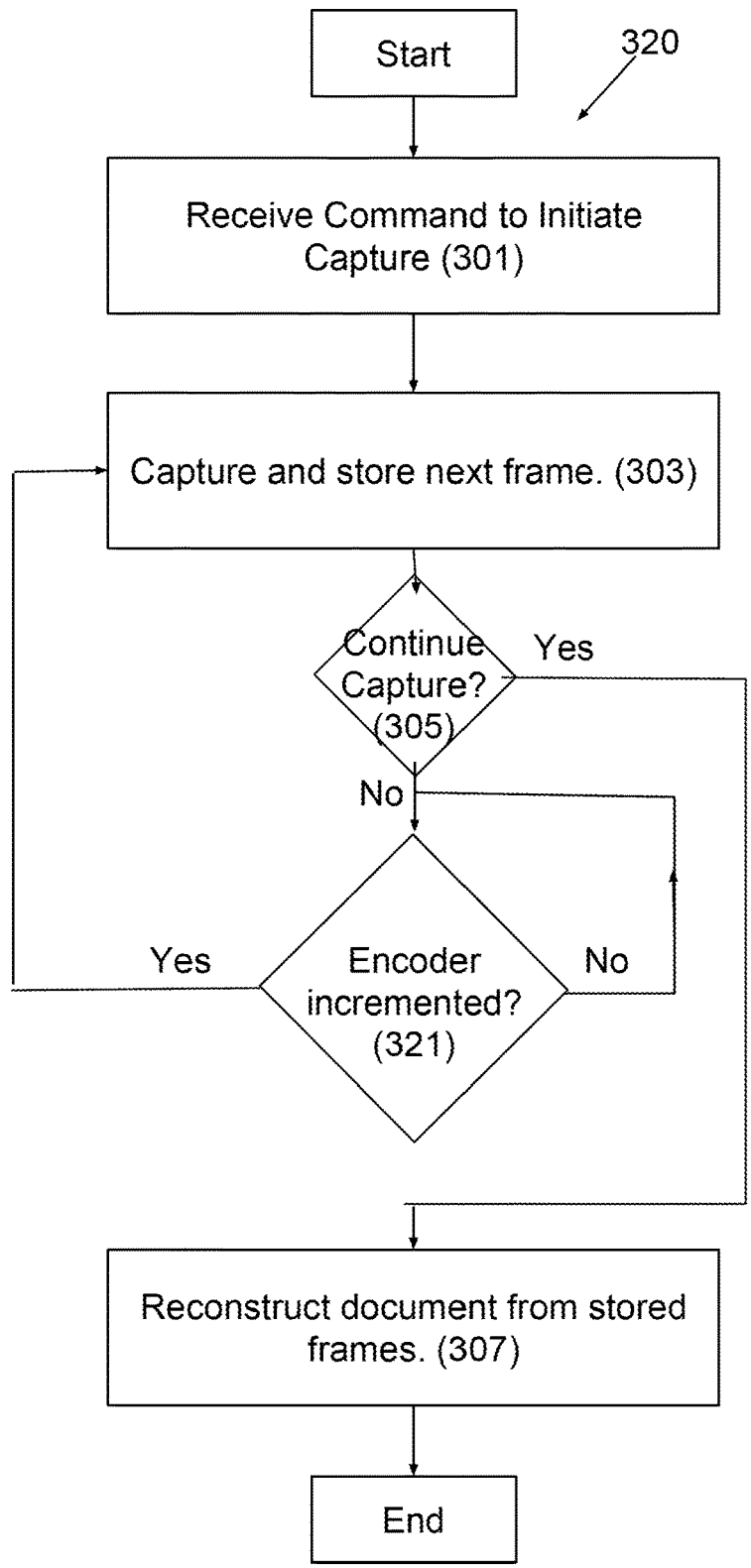

Third Embodiment—FIG. 3C

A third embodiment, method 320, is presented in connection with FIG. 3C. This embodiment utilizes encoder 130 of device 100 to determine when capture of a subsequent frame should be initiated. One objective of method 320 is to reduce the number of frames captured to reduce the burden on device resources (e.g., memory, battery, processing time). In this embodiment, at step 321 encoder 130 is used to determine the relative position and orientation of the ISP with respect to the position of the ISP at the prior frame. Once the amount of overlap between the present position of the ISP and the position of the ISP at the time of the prior frame capture has been reduced a satisfactory amount, method 300 returns to step 303 to capture a subsequent frame. The amount of overlap "reduction" required for triggering may be determined in any suitable way. For example, the algorithm may trigger capture of the next frame when less than 10%, 25%, 40% or 50% of the area covered by the ISP was covered by the ISP at the location where the previous frame was captured. Alternatively or additionally frame capture may be triggered whenever an unrecorded area is covered by the ISP.

In yet another embodiment, the ISP is effectively used as the encoder above. The movement of the device is determined by the tracking of document features in a sequence of frames itself. For example, a feature near the center of the most recently recorded frame may be tracked and recording of the next frame may be triggered when the feature is no longer covered by the ISP. In some embodiments, frames where insufficient movement has occurred are simply discard and not recorded to memory. Similar methods to those described above in connection with step 321 may be used to determine whether the movement has been sufficient to record a captured frame to memory.

It should be appreciated that methods 300, 310, and 320 are not exhaustive embodiments of the invention and the steps of these methods may be configured in any suitable way. For example, the use of encoder 130 in method 320 to control the frame capture times and the concurrent frame capture and image reconstruction described in method 310 may be combined. In such an embodiment, the frame capture could be controlled such that only when new areas are covered is frame capture triggered.

Fingerprint Reading

Another embodiment relates to objects or documents having a shape that does not conform with the ISP surface and thus cannot be placed entirely on the ISP at any one time regardless of size. An example of this is a complete fingerprint. While a finger can be pressed against an (e.g., flat) ISP to substantially conform to the ISP, it cannot be completely imaged in one frame, because the fingerprint continues up around the finger towards the nail. Those familiar with recording fingerprints with ink on paper should appreciate that typically the finger is rolled across the ink and then rolled across the paper to capture much more of the fingerprint pattern than could be captured with a single press (a "complete" fingerprint).

An embodiment of method 300 is used to capture a complete fingerprint. During sequential capture (steps 303 and 305), the user performs the fingerprint recording motion on the ISP surface. The ISP thus captures a sequence of frames, no one of which captures the complete fingerprint, however, at step 307, the frames are used to construct the complete fingerprint. In one embodiment, each frame is individually cropped down to only the area where the finger is in contact with the ISP surface. These cropped down images are then combined using any suitable image stitching methodology as discussed above. The result of the method is thus an image of the complete fingerprint which can be stored digitally. Advantageously, the user need not ink her thumb in order to make such a record.

It should be appreciated that methods other than method 300 may be used to record a complete fingerprint. Further, it should be appreciated that recording of a complete fingerprint is merely exemplary and other objects may be captured in same or similar manner.

Control Input

Another aspect relates to the use of an ISP for control input. In one embodiment, the ISP is integrated with a display and is used to distinguish different types of touch events used to control the device. For example, an image of the index finger fingerprint may trigger a first type of action, while an image of the middle finger fingerprint may trigger a second type of action.

The device displays icons and other features on the screen which may be interacted with by the user by touching the display at the location of such feature. The location of the user's touch may be identified directly by reading from the ISP and detecting the location of touch, or may be determined from a capacitive touch or other type of touch screen layer also integrated with the screen. If the ISP is used for detection of a touch event (having both a time and a location), the ISP may be continuously searched for touch events by reading from the photo-pixel array for indications of a touch event. The detection and location of a touch event may be determined from the intensity of the measured response of the photo-pixels, detection of a finger touch shaped image, in ways similar for edge detection described above, or in any other suitable way. If another touch sensor (e.g., capacitive touch) is used to detect touch events, this may trigger reading the affected area from the ISP. That is, the ISP may only read photo-pixels in the region at and near the detected touch.

The action taken by the device may be determined by the touch event including the timing and location of the touch and also the image of the touch event read by the ISP. The device may be configured to recognize particular images as different types of touch events. For example, the fingerprint of the user's index finger may define a "left click" event and the fingerprint of the user's middle finger may be defined as a "right click" event. Other fingerprints (e.g., thumb, ring, or pinky finger) or other images may be used to define other input events. For example, in one embodiment, a glove is worn by the user having different images located on some or all of the finger tips which are used to differentiate different touch events (e.g., each fingertip may be a different color or symbol). In some embodiments, the location of the touch event may not be used and only the timing and touch image are used to define the control input.

Configuring the device to recognize different images as different touch events may be done in any suitable way. For example, digital images of the different touch inputs may be loaded into the device and identified as distinct touch inputs. In another embodiment, the user is prompted to define the input images by placing each on the ISP as prompted by the device. The images may then be stored in the device memory for subsequent comparison or may be processed to identify key features that are to be used to recognize and distinguish the various input types. For example, any of various fingerprint recognition algorithms known in the art may be used of the input control image is a fingerprint.

In some embodiments, a degree of touch force is determined from the recorded input touch control image based on the amount/area of the control image that is received. The degree of touch force can thus also be used to command the device. For example, a "light" touch may be determined because only a small amount/area of the control image is recorded from the touch. On the other hand, a "hard" touch may be determined because a greater amount/area of the control image is recorded from the touch. For example, if a user touches lightly with her index finger, only a small amount/area of her fingerprint is in intimate contact with the ISP surface and is captured at the time of touch by the ISP. By contrast, if the user presses hard with her index finger on the display, a larger portion of her finger print is in intimate contact with the ISP surface and is captured at the time of touch by the ISP. Analysis of the ISP image can thus reveal, in the first case that the touch is an index finger touch, but also that the touch is a light touch because the portion of the overall control image of the index finger fingerprint has an area below a set threshold or does not include a sufficient area of the control image designated as required for a hard touch.

It should be appreciated that, while a binary degree of touch force ("light" or "hard") is disclosed, the degree of touch force may be defined in any suitable way. For example, three or more degrees may be defined (e.g. "light", "medium", or "hard"). As another example, the degree of touch force is practically a continuous number (e.g., a percentage of the control image captured).

It should further be appreciated that the control images may be sufficiently distinct that even if only a fraction of the control image is captured during a touch event, that fraction is enough to determined which input type is being input. Of course, if the degree of touch becomes too small, this may not be possible for some control images (e.g., fingerprints) while for others (e.g., different color fingertips) differentiation may always be possible, regardless of how slight the touch.

It should additionally be appreciated that, instead of the ISP disclosed herein, other 2D photosensors (e.g., a conventional CMOS photosensor coupled with proper optical components) may be used to achieve some or all of the disclosed functionalities.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty.

Although various embodiments of the present disclosure have been described in detail herein, one of ordinary skill in the art would readily appreciate modifications and other embodiments without departing from the spirit and scope of the present disclosure as stated in the appended claims.

What is claimed is:

1. A mobile electronic device comprising:
a display screen and an image sensor panel stacked on top of each other; and
a non-transitory computer readable memory;
wherein the mobile electronic device is configured to:
capture a sequence of frames corresponding to different portions of a document using the image sensor panel while the document is illuminated by light emitted from the display screen,
identify common features in neighboring frames of said sequence of frames,
combine said sequence of frames into an image based on the common features, such that the common features are spatially collocated in the image, and
record the image to the memory.

2. The device of claim 1, wherein the common features are identified in temporally adjacent frames in said sequence of frames.

3. The device of claim 1, further comprising an encoder for recording position and orientation of the mobile electronic device, and wherein the corresponding features are identified in frames in said sequence of frames that are determined from information recorded by the encoder to be spatially overlapping.

4. The device of claim 1, further comprising a user input device, wherein the processor is further configured to capture frames for said sequence of frames until receiving a signal from the user input device commanding termination of capture of additional frames.

5. The device of claim 1, wherein, after capture of a subset of the sequence of frames, the processor is further configured to perform the identification and combination of said subset; detect an incomplete document from the image, and continue to capture additional frames for the sequence of frames based on the detection of the incomplete document.

6. The device of claim 5, wherein the processor is configured to detect the incomplete document by determining an edge of the document does not form a complete perimeter of said document.

7. The device of claim 5, wherein the processor is configured to detect the incomplete document by detecting an edge of the document forming a complete perimeter and determine an area interior to the complete perimeter has not been completely imaged by the sequence of frames.

8. The device of claim 1, wherein the processor is further configured to: detect a complete document in the image and, after detection of the complete document, terminate the capture of frames in the sequence of frames.

9. The device of claim 8, wherein the processor is configured to detect an edge of the document forming a complete perimeter and determine an area interior to the complete perimeter has been completely imaged by the sequence of frames.

10. The device of claim 1, further comprising an encoder for recording position and orientation of the mobile electronic device, wherein the processor is further configured to:
record position and orientation of the mobile electronic device at a time of capturing each frame, and digitally shift and rotate each frame at least in part based on the position and orientation information measured by the encoder.

11. A method of imaging a document using a handheld device having an image sensor panel (ISP) and a display screen, the ISP and the display screen being stacked on top of each other, the method comprising:
   capturing a first frame corresponding to a first portion of the document using the ISP while illuminating the first portion of the document using light emitted from the display screen;
   capturing a second frame corresponding to a second portion of the document using the ISP while illuminating the second portion of the document using light emitted from the display screen, the second portion of the document overlapping with the first portion of the document at a common portion;
   spatially aligning the first frame and the second frame such that the common portion of the document imaged by both the first frame and second frame spatially coincide; and
   combining the spatially aligned first frame and second frame into a single image.

12. The method of claim 11, wherein
   capturing the first frame comprises illuminating the first portion of the document with a probing light of a first color,
   capturing the second frame comprises illuminating the second portion of the document with the probing light of the first color,
   the capturing of the first and second frames is repeated with a probing light of a second color, and
   the spatially aligning and combing is performed independently for the frames captured with the probing light of the first color and the probing light of the second color to produce a first color single image and a second color single image, the method further comprising:
   combining the first color single image and the second color single image to produce a multi-colored single image.

13. The method of claim 11, further comprising: sequentially capturing additional frames using the ISP until a stop capture command is generated; and repeating the spatially aligning act and the combining act for the additional frames wherein each iteration the first frame is replaced with the single image from the previous iteration and the second frame is replaced with a next additional frame among the additional frames.

14. The method of claim 13, further comprising: analyzing the single image to detect an edge of the document forming a perimeter within the single image; determining the single image is fully captured within the perimeter; and in response to successfully completing the analyzing and determining, generating the stop capture command.

15. The method of claim 13, further comprising: receiving a user input and generating the stop capture command.

16. A method for constructing a document image, comprising:
   placing an image sensor panel device proximate or in contact with a subject document with an image capturing surface of the image sensor panel facing the subject document, wherein the image sensor panel device comprises a surface light source;
   traversing the image sensor panel device on the subject document along a path, and while the image sensor panel device traverses on the subject document, illuminating the subject document using light emitted from the surface light source and capturing a plurality of snapshots each corresponding to a part of the subject document at various locations of the path, a least a portion of neighboring snapshots overlapping with each other; and
   constructing a document image of the subject document by stitching the captured snapshots in accordance with the overlapped portion of the neighboring snapshots.

17. The method of claim 16, further comprising:
   in response to detecting an edge of the document forming a complete perimeter and determining an area interior to the complete perimeter has been completely imaged by the plurality of snapshots, stopping capture of additional snapshots by the image sensor panel.

18. The method of claim 16, wherein constructing the document image by stitching comprises spatial shifting and spatially rotating snapshots to align features imaged in the plurality of snapshots.

19. The method of claim 18, wherein the stitching further comprises resampling the spatially shifted and spatially rotated plurality of snapshots to conform to a defined grid of image pixel locations for the document image.

20. The method of claim 19, wherein the defined grid is a rectangular grid.

* * * * *